United States Patent
Shimizu et al.

(10) Patent No.: US 9,079,166 B2
(45) Date of Patent: Jul. 14, 2015

(54) GRANULAR BODY OF TITANIUM OXIDE HAVING TRANSITION METAL AND/OR TRANSITION METAL OXIDE SUPPORTED THEREON, AND METHOD FOR DECOMPOSING WASTE PLASTIC/ORGANIC MATERIAL USING SAID GRANULAR BODY

(71) Applicants: Sakai Chemical Industry Co., Ltd., Osaka (JP); Rapas Corporation, Shiga (JP)

(72) Inventors: Hiromitsu Shimizu, Osaka (JP); Itsushi Kashimoto, Shiga (JP)

(73) Assignees: Sakai Chemical Industry Co., Ltd., Osaka (JP); Rapas Corporation, Shiga (JP)

( * ) Notice: Subject to any disclaimer, the term of this patent is extended or adjusted under 35 U.S.C. 154(b) by 0 days.

(21) Appl. No.: 14/364,846

(22) PCT Filed: Dec. 14, 2012

(86) PCT No.: PCT/JP2012/082476
§ 371 (c)(1),
(2) Date: Jun. 12, 2014

(87) PCT Pub. No.: WO2013/089222
PCT Pub. Date: Jun. 20, 2013

(65) Prior Publication Data
US 2014/0316018 A1    Oct. 23, 2014

(30) Foreign Application Priority Data
Dec. 15, 2011   (JP) ................... 2011-275006

(51) Int. Cl.
| | | |
|---|---|---|
| *C08J 11/04* | (2006.01) | |
| *B01J 23/889* | (2006.01) | |
| *B01J 23/72* | (2006.01) | |
| *B09B 3/00* | (2006.01) | |
| *B01J 35/00* | (2006.01) | |
| *B01J 35/02* | (2006.01) | |
| *B01J 35/08* | (2006.01) | |
| *B01J 35/10* | (2006.01) | |
| *B01J 23/888* | (2006.01) | |
| *C08J 11/16* | (2006.01) | |
| *B01J 21/06* | (2006.01) | |

(52) U.S. Cl.
CPC .............. *B01J 23/8892* (2013.01); *B01J 23/72* (2013.01); *B01J 23/888* (2013.01); *B01J 35/0026* (2013.01); *B01J 35/023* (2013.01); *B01J 35/08* (2013.01); *B01J 35/1014* (2013.01); *B01J 35/1038* (2013.01); *B01J 35/1042* (2013.01); *B09B 3/00* (2013.01); *C08J 11/16* (2013.01); *B01J 21/063* (2013.01)

(58) Field of Classification Search
CPC ...................................................... C08J 11/116
USPC .............. 521/41, 40; 588/314, 315, 316, 321; 502/309, 316, 324
See application file for complete search history.

(56) References Cited

U.S. PATENT DOCUMENTS

| | | | |
|---|---|---|---|
| 8,722,958 B2 * | 5/2014 | Kashimoto | 588/405 |
| 2002/0179424 A1 | 12/2002 | Osada et al. | |
| 2007/0249887 A1 | 10/2007 | Kitamura et al. | |

FOREIGN PATENT DOCUMENTS

| | | | |
|---|---|---|---|
| EP | 2327485 A1 | 6/2011 | |
| JP | 2005-307007 | 11/2005 | |
| JP | 2006-320832 A | 11/2006 | |
| WO | WO 2010/021122 | * | 2/2010 |

OTHER PUBLICATIONS

Written Opinion (in English) of the International Search Authority issued in corresponding International Patent Application No. PCT/JP2012/082476 dated Mar. 12, 2013 (7 pages).

International Preliminary Report on Patentability (in English) issued in corresponding International Patent Application No. PCT/JP2012/082476 dated Jun. 17, 2014 (8 pages).

Office Action received in corresponding Japanese Patent Application No. 2013-549325 dated Apr. 22, 2014 (English translation attached) (3 pages).

\* cited by examiner

*Primary Examiner* — Terressa Boykin
(74) *Attorney, Agent, or Firm* — Kilyk & Bowersox, P.L.L.C.

(57) ABSTRACT

An object of the present invention is to provide titanium oxide granules that have a novel structure and have a characteristic of highly efficient decomposing capability, and a method of decomposing plastic and organic waste by using the granules. The present invention has been completed based on the finding that a method of decomposing plastic waste by using titanium oxide granules having a transition metal and/or a transition metal oxide, in particular copper, supported thereon enables decomposition of plastic waste at extremely high efficiency in a low-temperature region for a long period of time as compared to methods of decomposing plastic waste by using the related-art titanium oxide granules.

18 Claims, 9 Drawing Sheets

Fig.6

| TREATED SUBSTANCE | FEED AMOUNT (g/min) | SET VALUE SUPPLIED AIR (ℓ/min) | SET VALUE EXHAUST AIR (ℓ/min) | AVERAGE CONCENTRATION OF DECOMPOSED GAS O₂ (%) | CO₂ (%) | CO (ppm) | NOx (ppm) | CH₄ (ppm) | VALUE FOR RISE IN TEMPERATURE IN EACH PORTION TITANIUM (°C) | DECOMPOSED GAS (°C) | P. INLET (°C) | EXHAUST TEMPERATURE (°C) | VALUE CALCULATED FROM AVERAGE CO% SUPPLIED AIR (ℓ/min) | EXHAUST AIR (ℓ/min) | CO₂ (%) | NO (ppm) | CONFIRMATION OF DECOMPOSITION |
|---|---|---|---|---|---|---|---|---|---|---|---|---|---|---|---|---|---|
| POLY CARBONATE | 1.0 | n=5 | 18 | 30 | 14.6 | 5.5 | 0 | 0 | 0 | 89.5 | 28.0 | 3.0 | 53~54 | 26 | 26 | 14.8 | 0 | COMPLETE DECOMPOSITION WAS CONFIRMED |
| | 1.5 | " | 27 | 40 | 10.4 | 9.3 | 0 | 0 | 0 | 112.7 | 41.0 | 4.0 | 52~54 | 23 | 24 | 8.8 | 0 | |
| | 2.0 | " | 36 | 50 | 10.2 | 9.3 | 0 | 0 | 3 | 164.0 | 59.0 | 7.0 | 61~66 | 30 | 31 | 9.0 | 0 | |
| POLY STYRENE | 1.0 | " | 25 | 35 | 13.0 | 6.5 | 0 | 0 | 0 | 118.7 | 54.0 | 4.0 | 57~58 | 27 | 27 | 6.1 | 0 | COMPLETE DECOMPOSITION WAS CONFIRMED |
| | 1.5 | " | 37 | 45 | 10.3 | 8.0 | 0 | 0 | 0 | 150.3 | 69.0 | 5.0 | 71~74 | 30 | 30 | 8.2 | 0 | |
| | 2.0 | " | 49 | 64 | 11.3 | 9.6 | 0 | 0 | 0 | 172.3 | 79.0 | 5.0 | | 44 | 45 | 7.4 | 0 | |
| NYLON 6 | 1.0 | " | 25 | 35 | 14.7 | 5.2 | 0 | 356 | 0 | * | 44.0 | 10.0 | 60~61 | 34 | 35 | 3.9 | 6540 | COMPLETE DECOMPOSITION WAS CONFIRMED |
| | 1.5 | " | 37 | 44 | 13.9 | 5.1 | 0 | 305 | 0 | 126.8 | 59.0 | 4.0 | 65~70 | 46 | 47 | 4.4 | 7400 | |
| | 2.0 | " | 49 | 64 | 14.6 | 4.9 | 0 | 157 | 7 | 149.6 | 67.0 | 0.0 | 92~99 | 68 | 70 | 4.0 | 6640 | |
| VINYL CHLORIDE | 1.0 | " | 12 | 17 | 12.7 | 6.9 | 0 | 0 | 5 | 60.3 | 31.0 | 0.0 | 38~36 | 11 | 11 | 6.3 | 0 | COMPLETE DECOMPOSITION WAS CONFIRMED |
| | 1.5 | " | 21 | 35 | 13.4 | 6.5 | 0 | 0 | 10 | 34.4 | 43.0 | 7.0 | 42~45 | 18 | 19 | 5.8 | 0 | |
| | 2.0 | " | 21 | 35 | 11.3 | 8.5 | 0 | 0 | 13 | 84.8 | 43.0 | 3.0 | 43~45 | 19 | 19 | 7.4 | 0 | |
| ABS | 1.0 | " | 21 | 28 | 12.7 | 1.1 | 0 | 1250 | 4 | 97.0 | 48.0 | 9.0 | 37~42 | 26 | 26 | 6.1 | 4000 | COMPLETE DECOMPOSITION WAS CONFIRMED |
| | 1.5 | " | 32 | 38 | 6.0 | 6.6 | 0 | 1275 | 4 | * | 69.0 | 15.0 | 46~54 | 36 | 37 | 3.5 | 4300 | |
| | 2.0 | " | 43 | 53 | 12.6 | 6.9 | 0 | 1098 | 3 | 153.0 | 80.0 | 6.0 | 92~95 | 51 | 52 | 6.1 | 4000 | |
| PET | 1.0 | " | 14 | 20 | 13.3 | 7.3 | 0 | 0 | 5 | 47.1 | 12.0 | 2.0 | 33 | 16 | 17 | 7.1 | 0 | COMPLETE DECOMPOSITION WAS CONFIRMED |
| | 1.5 | " | 21 | 28 | 12.4 | 8.3 | 0 | 0 | 11 | 98.3 | 47.0 | 5.0 | 37~40 | 22 | 22 | 7.9 | 0 | |
| | 2.0 | " | 28 | 35 | 11.6 | 9.3 | 0 | 0 | 13 | 117.6 | 58.0 | 1.0 | 46~50 | 26 | 27 | 8.6 | 0 | |
| POLY URETHANE | 1.0 | " | 20 | 25 | 13.0 | 6.6 | 0 | 835 | 6 | 92.9 | 44.0 | 1.0 | 39~41 | 21 | 22 | 4.4 | 8000 | COMPLETE DECOMPOSITION WAS CONFIRMED |
| | 1.5 | " | 28 | 35 | 11.0 | 7.5 | 0 | 955 | 12 | 118.6 | 62.0 | 4.0 | 48~51 | 25 | 26 | 5.5 | 10000 | |
| | 2.0 | " | 37 | 46 | 12.1 | 5.1 | 0 | 795 | 14 | * | 70.0 | 6.0 | 69~71 | 38 | 39 | 4.9 | 8900 | |
| POLY ETHYLENE | 1.0 | " | 28 | 35 | 11.7 | 6.1 | 0 | 0 | 16 | 106.0 | 54.0 | 9.0 | 51~53 | 27 | 28 | 5.8 | 0 | COMPLETE DECOMPOSITION WAS CONFIRMED |
| | 1.5 | " | 42 | 60 | 12.3 | 6.1 | 0 | 0 | 8 | 159.3 | 78.0 | 14.0 | 81~87 | 43 | 44 | 5.4 | 0 | |
| | 2.0 | " | 55 | 93 | 12.4 | 5.9 | 0 | 0 | 7 | 185.5 | 92.0 | 18.0 | 124~129 | 58 | 60 | 5.4 | 0 | |
| EPOXY RESIN | 1.0 | " | 10 | 16 | 15.4 | 4.6 | 0 | 322 | 2 | 37.1 | 21.0 | -2.0 | 37~36 | 14 | 14 | 4.3 | 4260 | COMPLETE DECOMPOSITION WAS CONFIRMED |
| | 2.0 | " | 18 | 24 | 14.3 | 5.7 | 0 | 535 | 3 | 46.5 | 22.0 | 6.0 | 36~37 | 23 | 25 | 4.8 | 4800 | |
| SILICON OIL | 0.5mℓ | " | 17 | 17 | 15.0 | 3.0 | 47 | 0 | 155 | 37.9 | 22.0 | 0.0 | 34~33 | 13 | 13 | 2.8 | 0 | COMPLETE DECOMPOSITION WAS CONFIRMED |
| | 1mℓ | " | 34 | 40 | * | * | * | * | * | 61.2 | 39.0 | 15.0 | | | | | | |

| GAS ANALYSIS | TITANIUM | TEMPERATURE OF TITANIUM OXIDE SET TEMPERATURE ACTUAL MEASURED TEMPERATURE | | | | | | |
|---|---|---|---|---|---|---|---|---|
| | | 300°C | 320°C | 340°C | 360°C | 380°C | 400°C | 420°C |
| | | 292~319 | 313~340 | 335~356 | 358~369 | 376~391 | 384~417 | 419~443 |
| $O_2$ (%) | RELATED-ART-PRODUCT | 20.82 | 20.87 | 20.54 | 18.30 | 17.32 | 15.94 | 15.03 |
| | THE PRESENT INVENTION | 20.65 | 19.41 | 14.58 | 12.72 | 12.21 | 11.74 | — |
| CO (ppm) | RELATED-ART-PRODUCT | 100 | 160 | 556 | 3140 | 4094 | 5000> | 5000> |
| | THE PRESENT INVENTION | 6 | 19 | 42 | 39 | 43 | 39 | — |
| $CO_2$ (%) | RELATED-ART-PRODUCT | 0 | 0 | 0.04 | 0.53 | 0.91 | 1.8 | 2.5 |
| | THE PRESENT INVENTION | 0.07 | 0.9 | 4.6 | 6 | 6.3 | 6.4 | — |

NOTE: THE OXYGEN CONCENTRATION WAS CALCULATED WITH CORECTION TO THE THEORETICAL CONCENTRATION OF 20.93% BECAUSE ZERO POINT CORRECTION COULD NOT BE CARRIED OUT.

B RELATED-ART TITANIUM OXIDE GRANULES

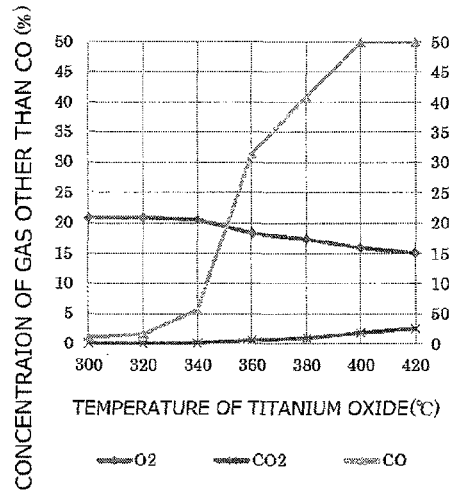

C TITANIUM OXIDE GRANULES OF THE PRESENT INVENTION

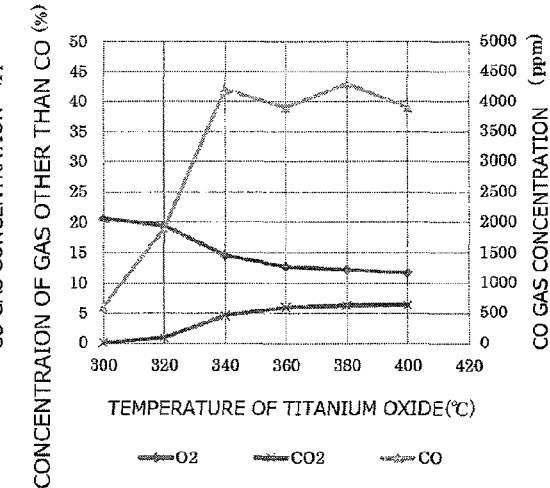

Fig.8

| TITANIUM CATALYST | PE FEED AMOUNT g/min | NUMBER OF TIMES OF FEED n | AVERAGE CONCENTRATION OF DECOMPOSED (% OR PPM) | | | |
|---|---|---|---|---|---|---|
| | | | $O_2$ % | $CO_2$ % | CO ppm | $CH_4$ ppm |
| RELATED-ART PRODUCT | 0.1 | 5 | 19.9 | 0.3 | 525 | 26 |
| ″ | 0.15 | 5 | 19.6 | 0.4 | 870 | 72 |
| ″ | 0.18 | 5 | 19.5 | 0.5 | 957 | 84 |
| ″ | 0.2 | 5 | 19.4 | 0.5 | 1087 | 85 |
| CuO1% | 0.1 | 5 | 19.8 | 0.4 | 10 | 0 |
| ″ | 0.2 | 5 | 19.3 | 0.8 | 17 | 0 |
| ″ | 1 | 5 | 17.7 | 2.7 | 93 | 14 |
| ″ | 2 | 3 | 16.3 | 3.6 | 418 | 52 |
| CuO3% | 0.2 | 5 | 19.2 | 1 | 12 | 0 |
| ″ | 1 | 5 | 14.7 | 4.5 | 71 | 0 |
| ″ | 2 | 3 | 8.6 | 8.8 | 145 | 5 |
| CuO5% | 0.2 | 5 | 19.3 | 0.9 | 12 | 0 |
| ″ | 1 | 5 | 15 | 3.9 | 87 | 0 |
| ″ | 2 | 3 | 8.5 | 8.4 | 199 | 2 |

Fig.9

|  | WEIGHT OF GRANULES REMAINING ON SIEVE | WEIGHT OF GRANULES PASSING THROUGH SIEVE | WEAR RATIO (ppm/h) |
|---|---|---|---|
| RELATED-ART TITANIUM OXIDE GRANULES | 497.578g | 0.167g | 14.0 |
| TITANIUM OXIDE GRANULES HAVING 3% CuO SUPPORTED THERON | 500.957g | 0.103g | 8.6 |

GRANULAR BODY OF TITANIUM OXIDE HAVING TRANSITION METAL AND/OR TRANSITION METAL OXIDE SUPPORTED THEREON, AND METHOD FOR DECOMPOSING WASTE PLASTIC/ORGANIC MATERIAL USING SAID GRANULAR BODY

The present application is a National Stage Application of PCT/JP2012/082476, filed Dec. 14, 2012, which claims priority from Japanese Patent Application No. 2011-275006, filed Dec. 15, 2011.

TECHNICAL FIELD

The present invention relates to titanium oxide granules having a transition metal and/or a transition metal oxide, in particular copper, supported thereon, and a method of decomposing plastic and organic waste, in particular, medical waste or infectious medical waste both including various kinds of plastics and organic substances by using the granules.

Note that this application claims the priority from Japanese Patent Application No. 2011-275006, which is incorporated herein by reference.

BACKGROUND ART

In recent years, there have been proposed various methods of treating and recycling plastic waste, and further, parts thereof have been practically employed. As a potent one of such methods of treating plastic waste, there has been proposed an apparatus and method involving gasifying the plastic waste by heating chips of the plastic waste in the presence of a decomposition catalyst of titanium oxide known as a photocatalyst (see Patent Literatures 1 and 2).

Further, catalysts used for decomposition treatment of the plastic waste chips have been variously studied (Patent Literatures 3 to 6).

The inventors of the present invention have provided excellent methods of treating plastic waste by using titanium oxide granules each having a structure entirely different from those of related-art titanium oxide (see Patent Literatures 7 and 8).

In addition, there have been reported several metal oxide-containing titanium oxide compounds (see Patent Literatures 9 to 11). However, Patent Literatures 9 to 11 do not disclose or suggest "substantially spherical titanium oxide granules having a metal supported thereon."

Meanwhile, regarding the prevention of secondary infection caused by infectious medical waste discharged from hospitals, dialysis facilities, and the like, a guideline specifying the method of treating waste of that kind was issued from the Ministry of Health and Welfare on Nov. 7, 1989, and was enforced on Apr. 1, 1990. The guideline orders the hospitals, dialysis facilities, and the like to conduct in-house sterilization treatment of the medical waste, in principle.

In this regard, there is an increasing demand for the development of a decomposition method, a decomposition apparatus, and a decomposition system each of which enables the treatment of plastic waste, in particular infectious medical waste containing polyvinyl chloride, in facilities such as hospitals and clinics safely and rapidly without the need of a large scale apparatus.

CITATION LIST

Patent Literature

[PTL 1] JP 2002-363337 A
[PTL 2] JP 2004-182837 A
[PTL 3] JP 2005-066433 A
[PTL 4] JP 2005-205312 A
[PTL 5] JP 2005-307007 A
[PTL 6] WO 2007/122967 A1
[PTL 7] WO 2010/021122 A1
[PTL 8] WO 2010/021397 A1
[PTL 9] JP 2011-063473 A
[PTL 10] JP 2011-084662 A
[PTL 11] JP 2011-079713 A

SUMMARY OF INVENTION

Technical Problem

An object of the present invention is to provide, in order to solve the above-mentioned problems, a method of decomposing plastic and organic waste by using titanium oxide granules that have a novel structure and have a characteristic of highly efficient decomposing capability.

Solution to Problem

As a result of diligent study aimed at solving the above-mentioned problems, the inventors of the present invention have completed the present invention based on the finding that a method of decomposing plastic waste by using titanium oxide granules having a transition metal or a transition metal oxide, in particular copper, supported thereon enables decomposition of plastic waste at extremely high efficiency as compared to methods of decomposing plastic waste by using the related-art titanium oxide granules.

That is, the present invention includes the following.

"1. A catalyst for decomposing plastic and organic waste, including titanium oxide granules having a transition metal and/or a transition metal oxide supported thereon and containing titanium oxide as an active component, in which the catalyst has the following characteristics:

(1) the granules each have a substantially spherical shape;

(2) granules each having a particle diameter of from 0.2 mm to 1.6 mm account for 70% or more of all the granules; and (3) an amount of the transition metal and/or the transition metal oxide to be supported is from 0.1 wt % to 10.0 wt %.

2. A catalyst according to the above-mentioned item 1, in which the transition metal and/or the transition metal oxide includes one or more selected from copper, nickel, platinum, palladium, rhodium, silver, cobalt, manganese, iron, tungsten, and oxides thereof.

3. A catalyst according to the above-mentioned item 1 or 2, in which the transition metal and/or the transition metal oxide is copper or copper oxide.

4. A catalyst according to any one of the above-mentioned items 1 to 3, in which an amount of the copper oxide to be supported is from 0.5 wt % to 5.0 wt % in terms of copper oxide.

5. A catalyst according to any one of the above-mentioned items 1 to 4, in which the granules each have a specific surface area in a range of from 30 $m^2/g$ to 50 $m^2/g$.

6. A catalyst according to any one of the above-mentioned items 1 to 5, in which the granules each have a pore volume in a range of from 0.20 cc/g to 0.60 cc/g.

7. A catalyst according to any one of the above-mentioned items 1 to 6, in which the granules each have a wear ratio of 2.0 wt % or less.

8. A catalyst according to any one of the above-mentioned items 1 to 7, in which the granules each have a tap density in a range of from 1.00 g/mL to 1.80 g/mL.

9. A catalyst according to any one of the above-mentioned items 1 to 8, in which the phrase "the granules each have a substantially spherical shape" includes the following characteristics:

(1) an angle at which a granule first starts sliding is from 0.5° to 15.0°; and (2) an angle at which all the granules finish sliding is from 2.0° to 30.0°.

10. A method of decomposing plastic and organic waste involving converting plastic and/or organic waste to gas, the method including the step of stirring while heating the plastic and/or organic waste in a range of from 300° C. to 560° C. together with a catalyst including titanium oxide granules having a transition metal and/or a transition metal oxide supported thereon and containing titanium oxide as an active component, in which the catalyst has the following characteristics:

(1) the granules each have a substantially spherical shape;

(2) granules each having a particle diameter of from 0.2 mm to 1.6 mm account for 70% or more of all the granules; and (3) an amount of the transition metal to be supported is from 0.1 wt % to 10.0 wt %.

11. A decomposition method according to the above-mentioned item 10, in which the transition metal and/or the transition metal oxide includes one or more selected from copper, nickel, platinum, palladium, rhodium, silver, cobalt, manganese, iron, tungsten, and oxides thereof.

12. A decomposition method according to the above-mentioned item 10 or 11, in which the transition metal or the transition metal oxide is copper or copper oxide.

13. A decomposition method according to any one of the above-mentioned items 10 to 12, in which an amount of the copper oxide to be supported is from 0.5 wt % to 5.0 wt % in terms of copper oxide.

14. A decomposition method according to any one of the above-mentioned items 10 to 13, in which the granules each have a specific surface area in a range of from 30 $m^2/g$ to 50 $m^2/g$.

15. A decomposition method according to any one of the above-mentioned items 10 to 14, in which the granules each have a pore volume in a range of from 0.20 cc/g to 0.60 cc/g.

16. A decomposition method according to any one of the above-mentioned items 10 to 15, in which the granules each have a wear ratio of 2.0 wt % or less.

17. A decomposition method according to any one of the above-mentioned items 10 to 16, in which the granules each have a tap density in a range of from 1.00 g/mL to 1.80 g/mL.

18. A decomposition method according to any one of the above-mentioned items 10 to 17, in which the phrase "the granules each have a substantially spherical shape" includes the following characteristics:

(1) an angle at which a granule first starts sliding is from 0.5° to 15.0°; and (2) an angle at which all the granules finish sliding is from 2.0° to 30.0°."

Advantageous Effects of Invention

The decomposition method of the present invention, involving using titanium oxide granules having a transition metal and/or a transition metal oxide, in particular copper, supported thereon has, as compared to decomposition methods involving using the related-art titanium oxide granules, at least about 6 times or more capability of treating plastic and organic waste, has high treatment capability even in a low-temperature region, and further, enables decomposition for a long period of time.

BRIEF DESCRIPTION OF DRAWINGS

FIG. 6 shows results of decomposition of various plastics or the like by using titanium oxide granules having 3 wt % CuO supported thereon.

FIG. 7 shows results of the decomposing capability of titanium oxide granules having 3 wt % CuO supported thereon with varying temperatures.

FIG. 8 shows results of the decomposing capability of titanium oxide granules having varying weight percentages of copper oxide supported thereon.

FIG. 9 shows confirmation results of the wear resistance of titanium oxide granules having copper oxide supported thereon.

Figure 1:
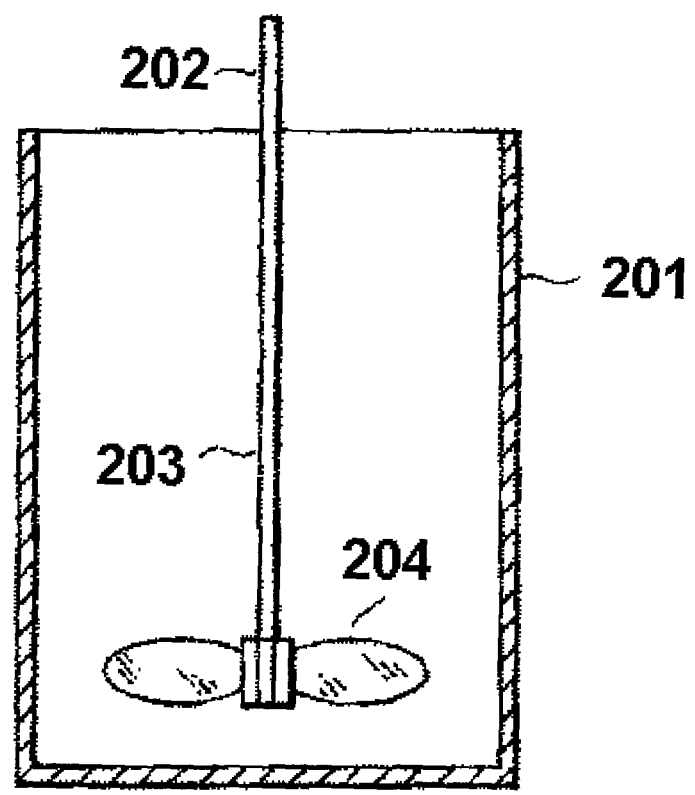
FIG. 1 is a view illustrating an apparatus for measuring the wear ratio of titanium oxide.

DESCRIPTION OF EMBODIMENTS (Heating Temperature of Catalyst)

The "heating temperature of a catalyst" of the present invention is required to be at least 300° C. or more and 600° C. or less, preferably 320° C. or more, particularly preferably from 420° C. to 560° C., still more preferably from 450° C. to 530° C., most preferably from 480° C. to 510° C.

Note that the heating temperature is a temperature in a reaction tank to cause the catalyst and plastic and/or organic waste to react with each other, and is a set temperature to keep the set temperature of the catalyst. That is, even when the set temperature is 480° C., the range of fluctuation of the catalyst temperature in the reaction tank is about ±30° C. with respect to the set temperature.

Further, at a certain position in the reaction tank, the temperature may become higher or lower than the particularly preferred "heating temperature of the catalyst" of the present invention depending on the shape and size of the reaction tank. However, most part of the catalyst has only to maintain the required heating temperature of the catalyst.

(Characteristics of Catalyst)

The catalyst of the present invention includes granules having a transition metal and/or a transition metal oxide supported thereon and containing titanium oxide as an active component.

In addition, examples of the transition metal include, but not particularly limited to, copper, platinum, palladium, rhodium, ruthenium, silver, cobalt, manganese, chromium, cadmium, vanadium, nickel, iron, tungsten, zinc, cerium, and aluminum. The transition metal or the transition metal oxide preferably includes copper, cobalt, and iron as well as oxides thereof (such as copper oxide and iron oxide). More specific examples of the oxides include copper oxide (CuO), cobalt oxide ($Co_3O_4$), and iron oxide ($Fe_2O_3$).

One or more kinds of the transition metal and the transition metal oxide described above may be supported on titanium oxide.

In addition, the amount of the transition metal and/or the transition metal oxide to be supported is expressed as described below. When the object to be supported is only a transition metal, the amount is expressed in terms of the weight of the transition metal, when the object to be supported is only a transition metal oxide, the amount is expressed in terms of the weight of the transition metal oxide, and when the object to be supported is a transition metal and a transition metal oxide, the amount is expressed in terms of the total weight of the transition metal and the transition metal oxide.

The amount of the transition metal and/or the transition metal oxide to be supported on the titanium oxide granules is from 0.1 wt % to 10 wt %, preferably from 0.2 wt % to 5.0 wt %, more preferably from 0.3 wt % to 5.0 wt %, still more preferably from 0.5 wt % to 5.0 wt %, most preferably from 1.0 wt % to 5.0 wt %.

Further, as the active component of the titanium oxide granules, in addition to titanium oxide granules formed only of titanium oxide, a mixture of titanium oxide with at least one kind selected from aluminum oxide and silicon oxide (hereinafter also referred to as inorganic oxide) is also included. Further, there is also included as the active component at least one kind of inorganic oxide selected from a composite oxide of titanium and niobium, a composite oxide of titanium and silicon, a composite oxide of titanium and at least one kind selected from silicon and tungsten, a composite oxide of titanium and at least one kind selected from silicon and molybdenum, a composite oxide of titanium and aluminum, zirconium oxide, a composite oxide of titanium and zirconium, and a titanium-containing perovskite compound.

Note that, of the inorganic oxides, examples of the titanium-containing perovskite compound include strontium titanate, barium zirconate titanate, and calcium titanate. In addition, there may be given, but not limited to, products obtained by substituting part of barium, zirconium, strontium, and/or calcium in those compounds with lanthanum, cerium, yttrium, or the like, for example.

In the method of decomposing plastic and organic waste of the present invention, by using a suitable catalyst under a heating condition, plastic and organic waste can be decomposed highly efficiently. In addition, the catalyst can be easily separated from metals, inorganic substances, and the like mixed with plastic waste.

The titanium oxide granules having a transition metal and/or a transition metal oxide supported thereon of the present invention each have a "particle diameter" of from 0.2 mm to 1.6 mm, preferably from 0.3 mm to 1.4 mm, more preferably from 0.4 mm to 1.2 mm, most preferably from 0.5 mm to 1.0 mm.

More specifically, titanium oxide granules having a particle diameter of from 0.2 mm to 1.6 mm, preferably from 0.3 mm to 1.4 mm, more preferably from 0.4 mm to 1.2 mm, most preferably from 0.5 mm to 1.0 mm account for 70% or more, preferably 80% or more, more preferably 90% or more of all the titanium oxide granules having a transition metal and/or a transition metal oxide supported thereon before use.

In addition, the main distribution of the particle diameters of titanium oxide having the transition metal and/or transition metal oxide supported thereon before use is from 0.4 mm to 1.2 mm, preferably from 0.5 mm to 1.0 mm.

Further, in order to decompose plastic and organic waste with which fine powders of metals and inorganic substances, in particular, of rare metals and the like are mixed, the above-mentioned "particle diameter" of each of the titanium oxide granules having a transition metal and/or a transition metal oxide supported thereon is from 0.6 mm to 1.6 mm, preferably from 0.8 mm to 1.4 mm, out of the above-mentioned ranges.

That is, the use of titanium oxide granules having a transition metal and/or a transition metal oxide supported thereon and having a larger particle diameter can make sieving depending on a difference in size of a particle diameter easier and enhance the collection ratio of finely powdered metals and inorganic compounds.

The phrase "the granules each have a substantially spherical shape" in the present invention means that the surface of each of the granules (particles) is rounded off and the degree of spherical shape in particle shape is higher.

Note that as indicators showing that the degree of spherical shape in particle shape is higher, there are exemplified a "circularity," a "slant angle for rolling of granules (particles)," and a "rest angle."

The "method of measuring a circularity" of the present invention can be carried out under the following condition and with the following apparatus.

(Condition)

A CCD camera is fixed to an inverted microscope, and the processing of images is performed with Image-Pro Plus. Specifically, titanium oxide granules having a transition metal and/or a transition metal oxide supported thereon are placed in a plastic petri dish so that the granules do not overlap with each other, images are taken into the inverted microscope described below at a magnification of four times, and the circularity of each granule is automatically measured by using Image-Pro Plus.

(Apparatus)

Microscope: inverted microscope TMD-300 Nikon Corporation,

CCD camera: Nippon Roper K. K., Retiga 2000R (1600× 1200 pixels)

Image processing apparatus: Nippon Roper K. K., Image-Pro Plus

Note that the "circularity" of each of the titanium oxide granules having a transition metal and/or a transition metal oxide supported thereon to be used in the method of decomposing plastic and organic waste of the present invention is from 1.00 to 2.00, preferably from 1.00 to 1.50, more preferably from 1.00 to 1.40, still more preferably from 1.00 to 1.30, most preferably from 1.00 to 1.20.

More specifically, titanium oxide granules each having a circularity of from 1.00 to 2.00, preferably from 1.00 to 1.50, more preferably from 1.00 to 1.40, still more preferably from 1.00 to 1.30, most preferably from 1.00 to 1.20 account for 70% or more, preferably 80% or more, more preferably 90% or more of all the titanium oxide granules having a transition metal and/or a transition metal oxide supported thereon before use.

The "slant angle for rolling of granules" of the present invention can be measured under the following conditions.

20 g of titanium oxide granules having a transition metal and/or a transition metal oxide supported thereon are placed on a glass plate, and the angle of the glass plate is changed from horizontal (0°) to slanted, to thereby measure (1) an angle at which a titanium oxide granule having a transition metal and/or a transition metal oxide supported thereon first starts sliding and (2) an angle at which all titanium oxide granules having a transition metal and/or a transition metal oxide supported thereon finish sliding.

Note that the values of the "slant angle for rolling of granules" of the titanium oxide granules having a transition metal and/or a transition metal oxide supported thereon to be used in the method of decomposing plastic and organic waste of the present invention are as described below.

(1) The angle at which a granule first starts sliding is from 0.5° to 15.0°, preferably from 0.5° to 10.0°, more preferably from 0.5° to 8.0°, most preferably from 0.5° to 5.0°.

(2) The angle at which all granules finish sliding is from 2.0° to 30.0°, preferably from 2.0° to 25.0°, more preferably from 2.0° to 22.0°, most preferably from 2.0° to 18.0°.

The "rest angle" of the present invention can be measured by the following method.

20 g of unused titanium oxide granules having a transition metal and/or a transition metal oxide supported thereon are dropped with a funnel to form a mountain-like layer, and the angle between the slant of the layer and the horizontal plane is measured. Note that the rest angle of powders and granules having better flowability is smaller, and in contrast, the rest angle of powders and granules having worse flowability is larger.

Note that the "rest angle" of the titanium oxide granules having a transition metal and/or a transition metal oxide supported thereon of the present invention is from 15° to 35°, preferably from 20° to 35°.

In addition, there is a "tap density" as another indicator showing characteristics of the titanium oxide granules having a transition metal and/or a transition metal oxide supported thereon of the present invention.

Note that the tap density of the titanium oxide granules having a transition metal and/or a transition metal oxide supported thereon in the present invention can be measured as described below.

About 180 g of titanium oxide granules having a transition metal and/or a transition metal oxide supported thereon are loaded into a 200-mL graduated cylinder made of glass, and the graduated cylinder is naturally dropped repeatedly ten times from the 50 mm-high position on a rubber sheet having a thickness of 10 mm. After that, the graduated cylinder is hit to a side of a wooden plate ten times from a 50 mm-distant position. Then, the above-mentioned operations are repeated two times. After that, the scale of the graduated cylinder is read to define the resultant value as the volume V (mL) of the granules. Then the granules are dried at 110° C. for 3 hours, and then the weight M (g) of the resultant granules is measured. Based on them, the tap density is calculated from the expression M/V.

Note that the "tap density" of the titanium oxide granules having a transition metal and/or a transition metal oxide supported thereon of the present invention is from 1.00 g/mL to 1.80 g/mL, preferably from 1.03 g/mL to 1.60 g/mL, more preferably from 1.05 g/mL to 1.55 g/mL.

In addition, there is a "wear ratio" as still another indicator showing characteristics of the titanium oxide granules having a transition metal and/or a transition metal oxide supported thereon of the present invention.

The wear ratio of the titanium oxide granules having a transition metal and/or a transition metal oxide supported thereon of the present invention can be measured by the following method.

The wear ratio is measured with a wear ratio measuring apparatus illustrated in FIG. 1. That is, the wear ratio measuring apparatus includes a sample container 201 having an inner diameter of 63 mm and a depth of 86 mm and a stirrer 202 fixed to the sample container, and the stirrer 202 includes a shaft 203 and three oval stirring blades 204 each having a length of 20 mm fixed to the lower end part of the shaft so as to extend at a 60° interval in the diameter direction from the shaft, with each of the stirring blades slanted so as to have an angle of 45° with respect to the horizontal plane. Each of the stirring blades is positioned so that the distance from its lowest edge to the bottom of the sample container is 8 mm.

Note that when the wear ratio of the titanium oxide granules having a transition metal and/or a transition metal oxide supported thereon is measured, 150 mL of the titanium oxide granules having a transition metal and/or a transition metal oxide supported thereon are weighed with a 200-mL graduated cylinder, and the resultant weight is recorded. After that, all the titanium oxide granules weighed are fed into the sample container and are stirred by using the stirrer described above at 300 rpm for 30 minutes. Then, the sample is taken out of the sample container and the whole is transferred onto a sieve having a mesh size of 0.5 mm. A sample passing through the sieve is weighed. Here, when the weight of the sample passing through the sieve having a mesh size of 0.5 mm is defined as W and the weight of the sample subjected to the measurement is defined as $W_0$, the wear ratio A of the sample is calculated according to $A=(W/W_0)\times 100(\%)$.

Note that the "wear ratio" of the titanium oxide granules having a transition metal and/or a transition metal oxide supported thereon to be used in the method of decomposing plastic and organic waste of the present invention is 2.0 wt % or less, preferably 1.5 wt % or less, more preferably 1.0 wt % or less.

In addition, there is a "specific surface area" as still another indicator showing characteristics of the titanium oxide granules having a transition metal and/or a transition metal oxide supported thereon to be used in the method of decomposing plastic and organic waste of the present invention.

The specific surface area of the titanium oxide granules having a transition metal and/or a transition metal oxide supported thereon of the present invention can be measured by the following method.

A BET method is used to carry out measurement in the present invention. The details of the measurement are as described below.

The BET method is a method involving causing molecules whose adsorption occupancy area is known to adsorb onto the surfaces of powder particles at a temperature of liquid nitrogen and determining the specific surface area of a sample based on the adsorption amount.

In the present invention, used as a specific surface area measurement apparatus is a 2300-model automatic measurement apparatus (Shimadzu Corporation, manufacturer).

Note that the titanium oxide granules having a transition metal and/or a transition metal oxide supported thereon to be used in the method of decomposing plastic and organic waste of the present invention each have a "specific surface area" of 30 $m^2/g$ or more, preferably from 33 $m^2/g$ to 65 $m^2/g$, more preferably from 35 $m^2/g$ to 50 $m^2/g$.

Further, the specific surface area of a catalyst formed of the titanium oxide granules having a transition metal and/or a transition metal oxide supported thereon before use is from 35 $m^2/g$ to 50 $m^2/g$.

As the specific surface area is larger, the contact surfaces between the granules and plastic waste become larger, and hence decomposition efficiency can be enhanced. However, when the specific surface area is too large, the thermal resistance of the granules becomes weak and the granules are liable to collapse and to turn to powder.

The result of Example 6 reveals that the "wear resistance" of the titanium oxide granules having a transition metal and/ or a transition metal oxide supported thereon to be used in the method of decomposing plastic and organic waste of the present invention is about 1.63 times higher than that of the titanium oxide granules without a transition metal and/or a transition metal oxide supported thereon (related-art titanium oxide granules).

That is, the titanium oxide granules having a transition metal and/or a transition metal oxide supported thereon to be used in the method of decomposing plastic and organic waste of the present invention have less decrease in decomposition efficiency even after use for a long period of time as compared to the related-art titanium oxide granules.

Further, in the "catalyst formed of the titanium oxide granules having a transition metal and/or a transition metal oxide supported thereon" of the present invention, the pore volume of titanium oxide having the transition metal and/or transition metal oxide supported thereon is from 0.10 cc/g to 0.80 cc/g, preferably from 0.20 cc/g to 0.60 cc/g, more preferably from 0.30 cc/g to 0.55 cc/g, most preferably from 0.40 cc/g to 0.50 cc/g.

Note that a method known per se can be used as a method of measuring the pore volume of the catalyst formed of the titanium oxide granules having a transition metal and/or a transition metal oxide supported thereon. In the present invention, a mercury intrusion method is used for the measurement. The details thereof are as described below.

The mercury intrusion method is a method involving applying pressure so as to cause mercury to penetrate into pores of powders by taking advantage of the large surface tension of mercury and determining a pore volume based on the value of the pressure and the amount of mercury intruded.

In the present invention, a porosimeter (mercury intrusion type, highest pressure: 200 MPa) manufactured by Thermo Finnigan Inc. was used.

As the "catalyst formed of the titanium oxide granules having a transition metal and/or a transition metal oxide supported thereon" of the present invention has the above-mentioned characteristics, the catalyst can decompose plastic and organic waste highly efficiently over a long period of time.

Further, the "catalyst formed of the titanium oxide granules having a transition metal and/or a transition metal oxide supported thereon" of the present invention has a narrower particle size distribution of titanium oxide granules having a transition metal and/or a transition metal oxide supported thereon than the related-art titanium oxide catalysts. Thus, by using a sieve having a larger mesh size and a sieve having a smaller mesh size than the particle size distribution of the titanium oxide granules, the granules and foreign matter (metals, inorganic substances, and the like mixed with a plastic) can be easily separated.

In the "method of producing titanium oxide granules" to be used in the present invention, a ground product of the above-mentioned inorganic oxide is stirred and granulated into sphere-like granules in the presence of at least one kind of sol selected from a titania sol, a silica sol, an alumina sol, and a zirconia sol, and the resultant granules are calcined at a temperature in a range of from 400° C. to 850° C., followed by sieving, to thereby yield calcined granules each having a particle diameter in a range of from 0.10 mm to 1.20 mm.

Note that the above-mentioned stirring granulation refers to, as known well, the granulation in which powder (powder of the inorganic oxide in the present invention) and a liquid binder (the above-mentioned sol in the present invention) are stirred, and then the aggregation of the powder due to the sol and a shearing effect due to high-speed stirring blades yield consolidated aggregates of the above-mentioned powder. Depending on the amount of a sol to be used, the rotation number of a stirring blade, a granulation time, and the like, the consolidation degree and size of the resultant aggregated granules can be arbitrarily adjusted. Further, by appropriately selecting a base plate in a granulation container in a stirring granulation apparatus, the shape of each of the resultant aggregates can be made closer to a sphere.

In the present invention, a granulator for stirring and granulating the inorganic oxide is not particularly limited. For example, preferably used are a mixer granulator NMG series manufactured by Nara Machinery Co., Ltd., a high-speed mixer and HIGH FLEX GRAL manufactured by Fukae Powtec Co., Ltd., an Eirich intensive mixer (Eirich reverse-flow type high-speed mixer) manufactured by Nippon Eirich Co., Ltd., a high-speed stirring granulator HSG series manufactured by G-Labo, Inc., a kneader/high-speed stirring granulator SPG series and a high-speed mixer/grinder spartan granulator manufactured by Dalton Co., Ltd., a vertical granulator VG-CT series manufactured by Powrex Corporation, and the like.

The inorganic oxide is stirred and granulated in the presence of the sol. In order to further enhance the sphericalness of the resultant granules and also to make the particle size distribution of the granules more precise, the granules obtained by the stirring granulation may be additionally granulated in the presence of the sol by at least one kind of method selected from tumbling granulation and fluidized-bed granulation.

In the granulation, in order to make the resultant granules harder and further enhance the wear resistance of the granules, a mixture of a ground product of the inorganic oxide and a ground product obtained by drying and calcining the sol, followed by pulverization may be used together with the sol.

The tumbling granulation refers to, as already known well, a granulation method involving giving a tumbling motion to a mixture of powder and a liquid binder, to thereby yield aggregated granules. The fluidized-bed granulation refers to, as also already known well, a granulation method involving supplying a liquid binder into a fluidized bed of powder and causing the formation of bridges between particles owing to the binder, to thereby yield aggregated granules.

As mentioned above, the inorganic oxide is stirred and granulated, the resultant granules are further granulated by at least one kind of method selected from the tumbling granulation and the fluidized-bed granulation, and then the granules obtained are, as described above, calcined at a temperature in a range of from 400° C. to 850° C., followed by sieving, to thereby collect particles each having a particle diameter in a range of from 0.1 mm to 1.2 mm. As a result, granules each having a necessary particle size can be obtained as a catalyst according to the present invention.

A tumbling granulator and a fluidized-bed granulator (combined granulator) for the granulation mentioned above are not particularly limited as well in the present invention. Examples thereof include a fluidized-bed granulation apparatus "NEW/MARUMERIZER" and a spheronizer "MARUMERIZER" manufactured by Dalton Co., Ltd., and a fluidized-bed granulation apparatus and a tumbling/fluidizing coating apparatus "Multiplex" series manufactured by Powrex Corporation.

The "titanium oxide granules having a transition metal and/or a transition metal oxide supported thereon" of the present invention can be obtained by allowing the granules obtained above to support the transition metal and/or the transition metal oxide by the following method. The details of the method are as described below.

Hitherto, there have been known various methods of allowing titanium oxide granules to support a transition metal and/or a transition metal oxide.

The catalyst of the present invention is not particularly limited by the method of supporting a transition metal and/or a transition metal oxide. For example, an impregnation method, a kneading method, a deposition method, an ion exchange method, a co-precipitation method, or a combination thereof can be employed. Of those, in the catalyst of the present invention, the transition metal and/or the transition metal oxide is preferably supported by an impregnation method.

According to the impregnation method, a catalyst having high activity and high wear strength can be obtained. According to this method, the catalyst can be obtained by immersing the granules obtained above into an aqueous solution of a soluble transition metal salt such as a nitrate salt or an acetate salt, followed by drying and then calcination at from 200° C. to 500° C.

Further, according to the present invention, in the case of allowing the granules as described above to support the transition metal and/or the transition metal oxide, the amount of the transition metal and/or the transition metal oxide to be supported generally falls within a range of from 0.1 wt % to 10 wt %. When the amount of the transition metal and/or the transition metal oxide to be supported is less than the lower limit described above, the catalyst has insufficient activity. On the other hand, even when the ratio of the transition metal and/or the transition metal oxide to be supported exceeds the upper limit described above, corresponding increase in the activity of the catalyst cannot be obtained. However, as necessary, the granules may be allowed to support the transition metal and/or the transition metal oxide beyond the upper limit.

Any known decomposition apparatus may be used as a decomposition apparatus for plastic and organic waste to be used in the method of decomposing plastic and organic waste of the present invention. However, the titanium oxide granules having a transition metal and/or a transition metal oxide supported thereon of the present invention exhibit very high decomposition efficiency. Thus, it is preferred to use a catalyst-circulating decomposition apparatus for plastic and organic waste, the apparatus being high in efficiency in the contact of the granules with plastic and organic waste, rather than the related-art batch-type decomposition apparatus. Note that the catalyst-circulating decomposition apparatus for plastic and organic waste is described in WO 2007/122967 A1.

Besides, the above-mentioned decomposition apparatus for plastic and organic waste includes oxidation catalyst treatment means and/or reduction catalyst treatment means in addition to the above-mentioned means for treating plastic and organic waste, and further includes preferably lime neutralization treatment means.

Further, the decomposition apparatus to be used in the decomposition method of the present invention may include one or more kinds of means selected from the following:
(1) alumina catalyst treatment means;
(2) means for grinding plastic and organic waste;
(3) carrier gas supply means;
(4) means for collecting scattered metals, inorganic substances, and/or catalysts discharged from a reaction tank for means for treating plastic and organic waste;
(5) cyclone dust collection means (first dust collection means);
(6) dust collection means with a bag filter (second dust collection means);
(7) heat exchange means;
(8) preheater means;
(9) exhaust blower means;
(10) cooling means;
(11) heat recovery means;
(12) HCl continuous measurement means;
(13) CO continuous measurement means;
(14) alarm means; and
(15) oxidation catalyst treatment means and/or reduction catalyst treatment means.

The "decomposition system for plastic and organic waste" of the present invention means carrying out the decomposition of plastic and organic waste by using any one of the decomposition apparatus described above and by further using the titanium oxide granules having a transition metal and/or a transition metal oxide supported thereon of the present invention.

Further, in the decomposition method or decomposition system for plastic and organic waste of the present invention, for example, when the plastic waste to be treated is any one of various medical plastic wastes such as polyvinyl chloride, polyurethane, and Teflon (trademark) and the like, hydrogen chloride, sulfur compounds, hydrogen fluoride, a cyan gas, and nitrogen-containing compounds are generated in the treatment process. Hydrogen chloride and the like cannot be emitted into the atmosphere as they are. Therefore, the lime neutralization treatment means is preferably introduced.

The rotation number of the stirring of a catalyst formed of the titanium oxide granules having a transition metal and/or a transition metal oxide supported thereon and plastic waste is from 5 rpm to 80 rpm, preferably from 10 rpm to 60 rpm, though the rotation number varies depending on the volume of a reaction container, the shape of a stirring blade, and a stirring method. Note that regardless of whether the reaction container adopts a batch system or a circulation system, the same rotation number is preferred.

Those values are ones set by considering the fact that when the rotation number is too large, titanium oxide having the transition metal and/or transition metal oxide supported thereon wears to a large extent, but when the rotation number is small, the efficiency in the contact of titanium oxide having the transition metal and/or transition metal oxide supported thereon with plastic and/or organic waste becomes lower.

The plastic and organic waste applicable to the decomposition method or decomposition system of the present invention are not particularly limited. In addition to the general-purpose thermoplastic plastics such as polyethylene and polypropylene, thermosetting plastics can be decomposed and gasified by the method of the present invention. Although the plastic and organic waste are preferably crushed to several cubic millimeters in view of decomposition efficiency, the waste may also be subjected to the decomposition treatment without crushing.

Note that objects that can be decomposed by the method of decomposing plastic and organic waste of the present invention, including organic substances, are not particularly limited, and examples of the objects include: plastics such as polyethylene, polypropylene, polyester, polyethylene terephthalate (PET), polystyrene, polycarbonate, polyurethane, polyvinyl chloride, and Teflon (trademark); nylon (for example, nylon 6); an ABS resin; a laminated plate including a glass substrate and an epoxy resin; diapers; artificial dialyzers; anticancer drugs; treated articles relating to gene research; treated articles of bacteria and microorganisms; information-relating device terminals; confidential information-relating devices (such as a CD-R); oils (such as a silicon oil); plastic waste generated from automobiles and household electric appliances; valuable metal recovery; and separation of organic substances from metals and inorganic substances. Further, in the case of medical waste, metals such as stainless steel and aluminum may be mixed with the waste, or a metal may be deposited from the vapor onto or adhere to the surface of the waste depending on the use of the medical waste. Further, the plastic waste does not only refer to used plastics, but also refer to unnecessary plastics and organic substances, which are unused.

The present invention is described below by way of Examples, but the present invention is by no means limited thereto.

EXAMPLES

Example 1

Production of Titanium Oxide Granules Having Transition Metal and/or Transition Metal Oxide Supported Thereon of the Present Invention Titanium oxide having the transition metal and/or transition metal oxide supported thereon to be used in the present invention was produced by a plurality of methods described below. The details of the methods are as described below.

(1) Titanium Oxide Granule 1 Having Copper Oxide Supported Thereon

In a titanium oxide production process using a sulfuric acid method, a slurry of titanium hydroxide obtained through a hydrolysis step was filtered and washed with water, followed by repulping, to thereby yield Slurry A. Nitric acid was added as a solating agent to Slurry A, yielding Sol B of titanium oxide. Further, part of Sol B was heated to 100° C. and dried, producing a dried gel. The dried gel was calcined at 500° C. for 3 hours in an electrical furnace, yielding Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 mm, to thereby yield granules each having a particle diameter of from 0.1 mm to 1.2 mm. The weight of the granules was defined as 100 wt %.

Note that, in the present invention, the phrase "granules each having a particle diameter of from 0.1 mm to 1.2 mm" refers to granules obtained by sieving granules by using a standard 15-mesh sieve made of stainless steel wire mesh (wire diameter: 0.5 mm, mesh size: 1.19 mm) and a 150-mesh sieve made of stainless steel wire mesh (wire diameter: 0.065 mm, mesh size: 0.104 mm), that is, granules passing through the 15-mesh sieve and remaining on the 150-mesh sieve.

Specifically, the granules each having a particle diameter of from 0.1 mm to 1.2 mm were obtained in the following manner. That is, the above-mentioned 15-mesh standard sieve was fixed to the upper lid of a Ro-Tap standard sieve shaker manufactured by Yoshida Seisakusho Co., Ltd. and the above-mentioned 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, thereby yielding granules passing through the 15-mesh sieve and remaining on the 150-mesh sieve as the granules each having a particle diameter of from 0.1 mm to 1.2 mm.

Finally, the granules were immersed into an aqueous solution containing varying concentrations of copper nitrate, followed by drying and then calcination at 500° C., to obtain titanium oxide granules having 1 wt % CuO, 3 wt % CuO, or 5 wt % CuO supported thereon. Note that the amount of copper oxide supported was confirmed by means of fluorescent X-rays.

(2) Titanium Oxide Granule 2 Having Copper Oxide Supported Thereon

Slurry A of titanium hydroxide obtained in the section (1) was heated at 100° C. and dried, producing a dried gel. The dried gel was calcined at 500° C. for 3 hours in an electrical furnace and was then subjected to grinding treatment, yielding a ground product of Calcined titanium oxide D. 50 Parts by weight of the ground product of Calcined titanium oxide D and 50 parts by weight of the ground product of Calcined titanium oxide C were mixed.

The mixture of 50 parts by weight of the ground product of Calcined titanium oxide D and 50 parts by weight the ground product of Calcined titanium oxide C was treated in the same manner as in the section (1). The resultant particles were dried, calcined, and sieved, yielding granules each having a particle diameter of from 0.1 mm to 1.2 mm.

Finally, the granules were immersed into an aqueous solution containing varying concentrations of copper nitrate, followed by drying and then calcination at 500° C., to obtain titanium oxide granules having 1 wt % CuO, 3 wt % CuO, or 5 wt % CuO supported thereon. Note that the amount of copper oxide supported was confirmed by means of fluorescent X-rays.

(3) Titanium Oxide Granule 3 Having Copper Oxide Supported Thereon

The titanium oxide granules obtained in the section (1) were further granulated so as to each have a more spherical shape by spraying the ground product of Titanium oxide C and a 4-fold dilution of Sol B diluted with water by using a tumbling granulator "MARUMERIZER." The resultant particles were treated in the same manner as in the section (1), yielding granules each having a particle diameter of from 0.1 mm to 1.2 mm.

Finally, the granules were immersed into an aqueous solution containing varying concentrations of copper nitrate, followed by drying and then calcination at 500° C., to obtain titanium oxide granules having 1 wt % CuO, 3 wt % CuO, or 5 wt % CuO supported thereon. Note that the amount of copper oxide supported was confirmed by means of fluorescent X-rays.

(4) Titanium Oxide Granule 4 Having Copper Oxide Supported Thereon

Sol B of titanium oxide obtained in the section (1) and ammonium tungstate were mixed. The mixture was heated at 100° C. and dried, producing a dried gel. The dried gel was calcined at 500° C. for 3 hours in an electrical furnace, yielding a calcined titanium-tungsten composite oxide (weight ratio of titanium oxide to tungsten oxide: 90:10).

Calcined titanium-tungsten composite oxide E was ground, producing a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium-tungsten composite oxide granules.

Next, the granules were further granulated so as to each have a more spherical shape by spraying the ground product of Calcined titanium-tungsten composite oxide E and a 4-fold dilution of Sol B diluted with water by using a spheronizer "MARUMERIZER." The resultant granules were treated in the same manner as in the section (1), yielding granules each having a particle diameter of from 0.1 mm to 1.2 mm.

Finally, the granules were immersed into an aqueous solution containing varying concentrations of copper nitrate, followed by drying and then calcination at 500° C., to obtain titanium-tungsten composite oxide granules having 1 wt % CuO, 3 wt % CuO, or 5 wt % CuO supported thereon. Note that the amount of copper oxide supported was confirmed by means of fluorescent X-rays.

(5) Titanium Oxide Granule 5 Having Transition Metal and/or Transition Metal Oxide Supported Thereon By the same methods as those described in the sections (1) to (4), titanium oxide granules having $Co_3O_4$, $Fe_2O_3$, $Mn_2O_3$, and NiO supported thereon instead of CuO were obtained.

It was confirmed that all the characteristics of the titanium oxide granules 1 to 5 having a transition metal and/or a transition metal oxide supported thereon fell within the following ranges.

BET specific surface area: 30 $m^2/g$ to 50 $m^2/g$
Pore volume measured by a mercury intrusion method: 0.20 cc/g to 0.60 cc/g
Tap density: 1.00 g/mL to 1.80 g/mL
Wear ratio: 2.0 wt % or less
Angle at which a granule first starts sliding: 0.5° to 15.0°
Angle at which all the granules finish sliding: 2.0° to 30.0°
Circularity: 1.00 to 2.00
Rest angle: 15° to 35°

(Production of Related-Art Titanium Oxide Granules)

Titanium oxide granules were obtained by the method described in WO 2010/021122 A1. The characteristics of the titanium oxide granules are as described below.

Specific surface area ($m^2/g$): 39.3
Pore volume (cc/g): 0.42
Average pore diameter (Å): 624

Example 2

Confirmation of Treatment Capability of Titanium Oxide Granules Having Copper Oxide Supported Thereon of the Present Invention The treatment capability of the titanium oxide granules having copper oxide supported thereon of the present invention was compared to that of the related-art titanium oxide granules without copper oxide supported thereon. Each condition and an apparatus used are as described below.

1. Experimental apparatus (reaction container): 1 kg-volume stirrer-type decomposition experimental apparatus
2. Injected air flow rate: 50 L/min
3. Temperature in reaction container: 480° C.
4. Used catalyst: 800 g
Titanium oxide granules having 1 wt % CuO supported thereon obtained in the section (1) of Example 1
Related-art titanium oxide granules
5. Plastic waste: polyethylene pellet (feeding interval is 1 minute)
6. Feed amount of plastic waste: 0.2 g/min, 0.4 g/min, 0.8 g/min
7. Rotation number of a stirring blade in a decomposition tank: 60 rpm
8. Exhaust amount: 340 L/min (exhaust blower: 60 Hz)
9. Amount of gas collected in a decomposition tank: 0.4 L/min
10. A continuous measurement device for gas concentration PG-250 (manufacturer: HORIBA, Ltd.) was used to measure gas concentrations {$NO/NO_x$, CO, $CO_2$, $O_2$, and $SO_2$}.

Note that decomposition of plastic waste utilizes $O_2$ to decompose plastic (organic substance) into $H_2O$ and $CO_2$. Therefore, a larger amount of $O_2$ consumed and a larger amount of $CO_2$ generated are indicators showing high decomposing capability (efficiency). In addition, the amount of $SO_2$ generated is an indicator of a methane formation reaction and the amount of CO generated is an indicator of undecomposed organic substances. Hence, a lower amount of $SO_2$ generated and a lower amount of CO generated are indicators showing high decomposing capability (efficiency).

11: Others

Lime: 700 g, $MnO_2$ catalyst inlet temperature: 200° C., Pt catalyst inlet temperature: 400° C.

(Results of Decomposition Using Titanium Oxide Granules Having 1 wt % CuO Supported Thereon)

Figure 2:
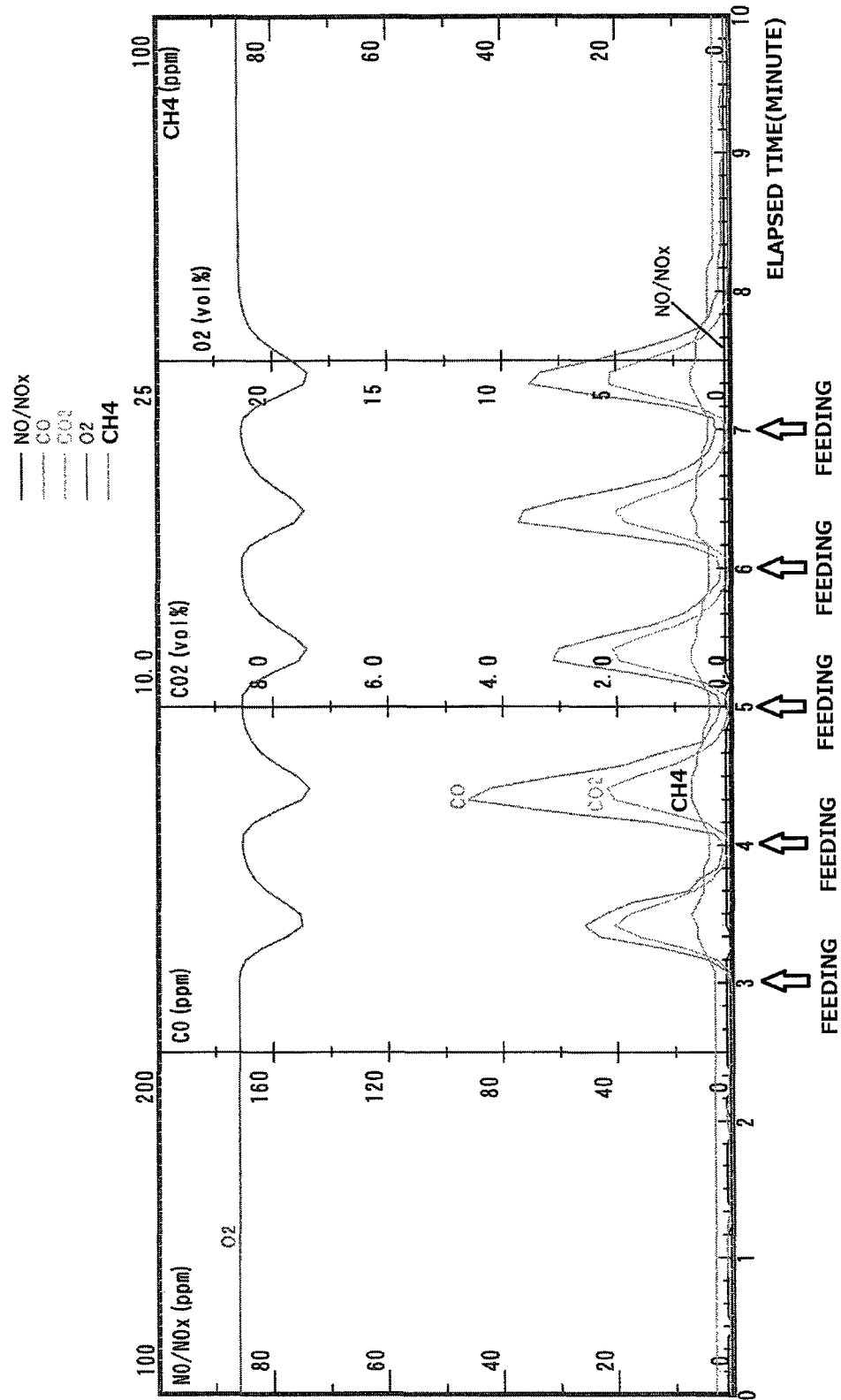
FIG. 2 shows results of decomposition of polyethylene pellets (feeding at 0.2 g/min) by using titanium oxide granules having 1 wt % CuO supported thereon.
Figure 3:
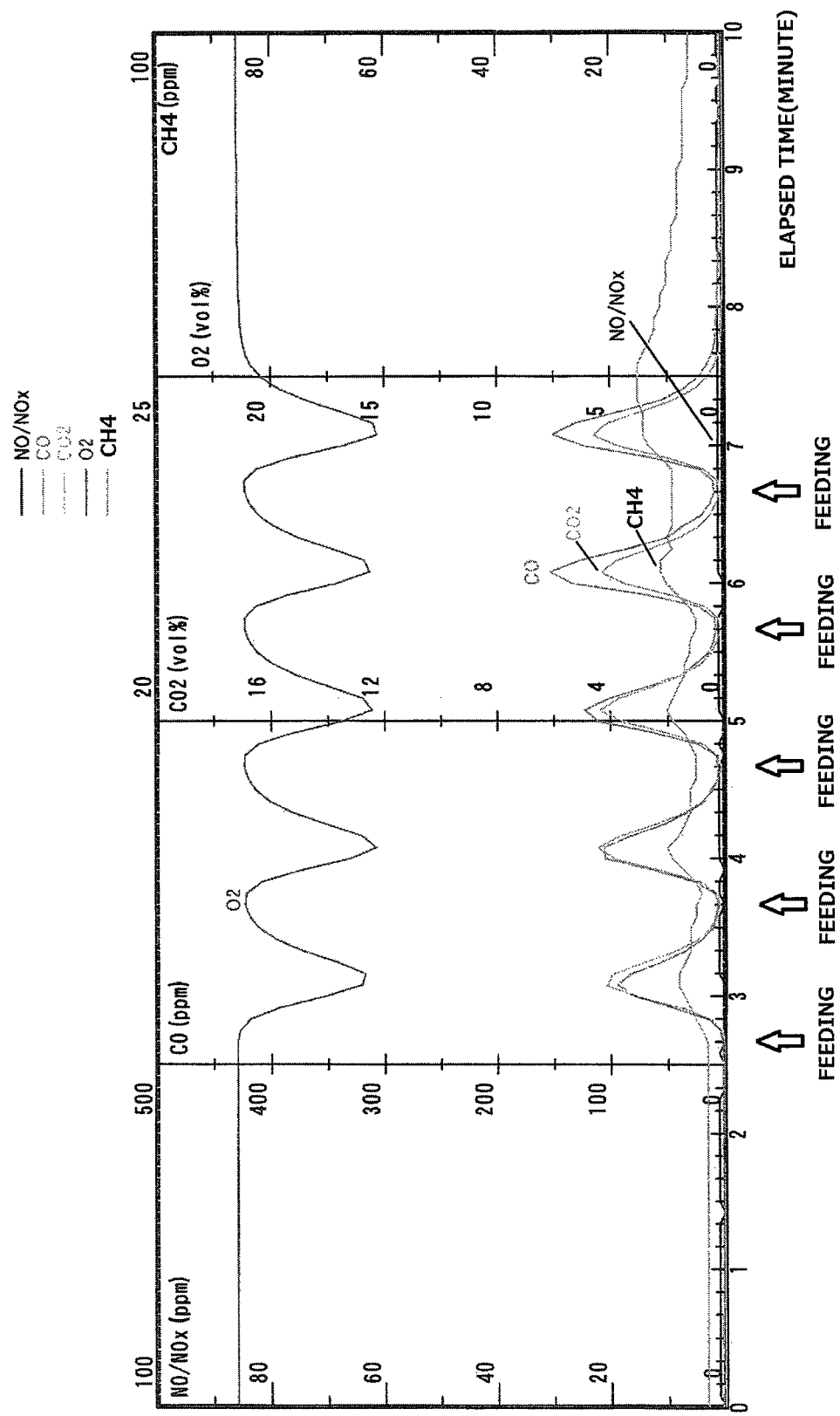
FIG. 3 shows results of decomposition of polyethylene pellets (feeding at 0.4 g/min) by using titanium oxide granules having 1 wt % CuO supported thereon.
Figure 4:
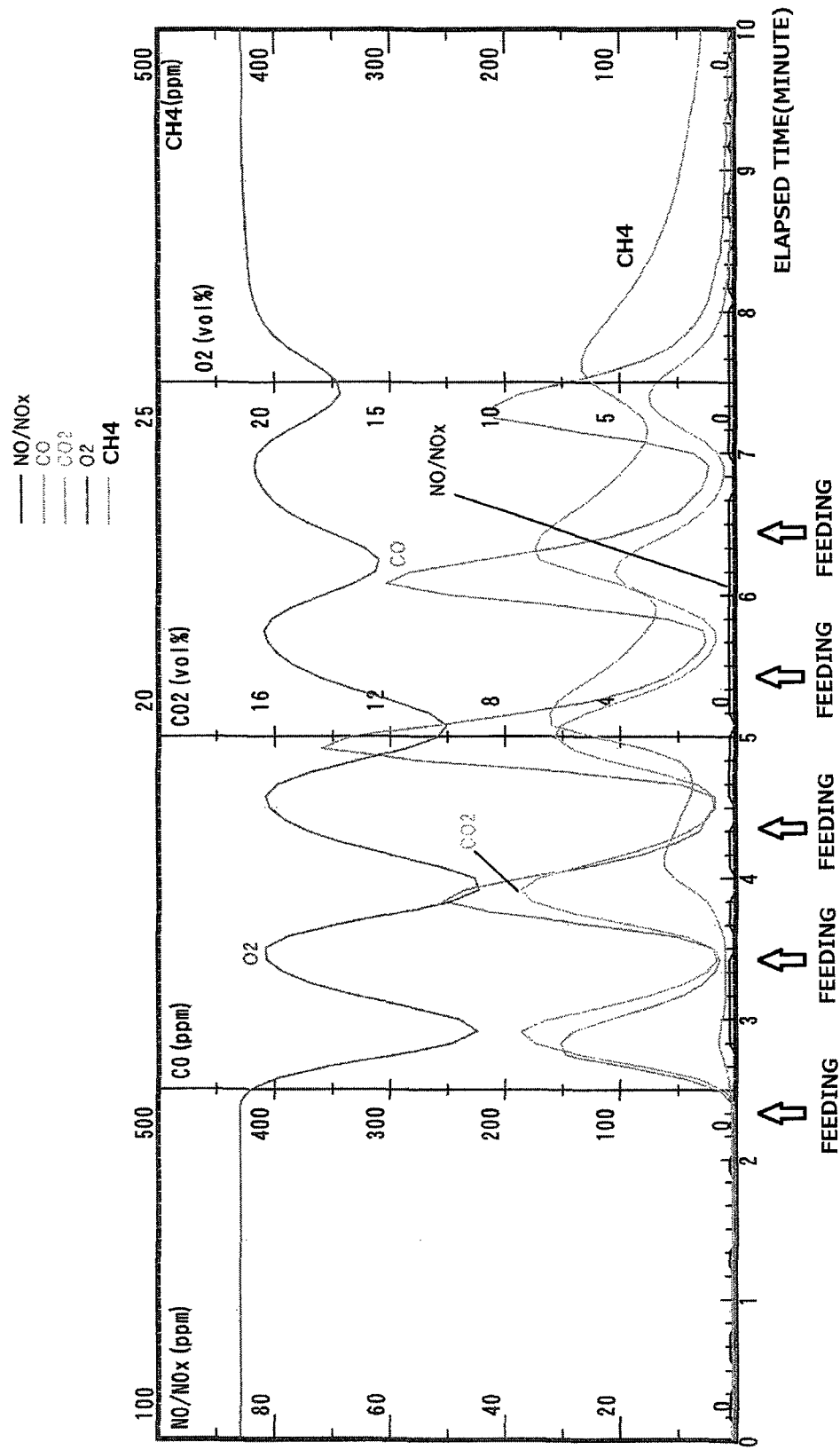
FIG. 4 shows results of decomposition of polyethylene pellets (feeding at 0.8 g/min) by using titanium oxide granules having 1 wt % CuO supported thereon.

FIGS. 2 to 4 show the results of the treatment capability of titanium oxide granules having 1 wt % CuO supported thereon.

When polyethylene pellets were fed at 0.2 g/min (FIG. 2), the CO concentration rose to from about 50 to 92 ppm, the $CO_2$ concentration was from about 2.0 to 2.2 vol %, and the $SO_2$ concentration rose to about 6 ppm.

When polyethylene pellets were fed at 0.4 g/min (FIG. 3), the CO concentration rose to from about 90 to 150 ppm, the $CO_2$ concentration was from about 4.0 to 4.5 vol %, and the $SO_2$ concentration rose to from about 8.0 to 15 ppm.

When polyethylene pellets were fed at 0.8 g/min (FIG. 4), the CO concentration rose to from about 150 to 360 ppm, the $CO_2$ concentration was from about 3.0 to 7.5 vol %, and the $SO_2$ concentration rose to from about 10 to 170 ppm.

Note that, in each result, the amount of the titanium oxide granules having a transition metal and/or a transition metal oxide supported thereon in the reaction container did not change.

(Results of Decomposition Using Related-Art Titanium Oxide Granules)

Figure 5:
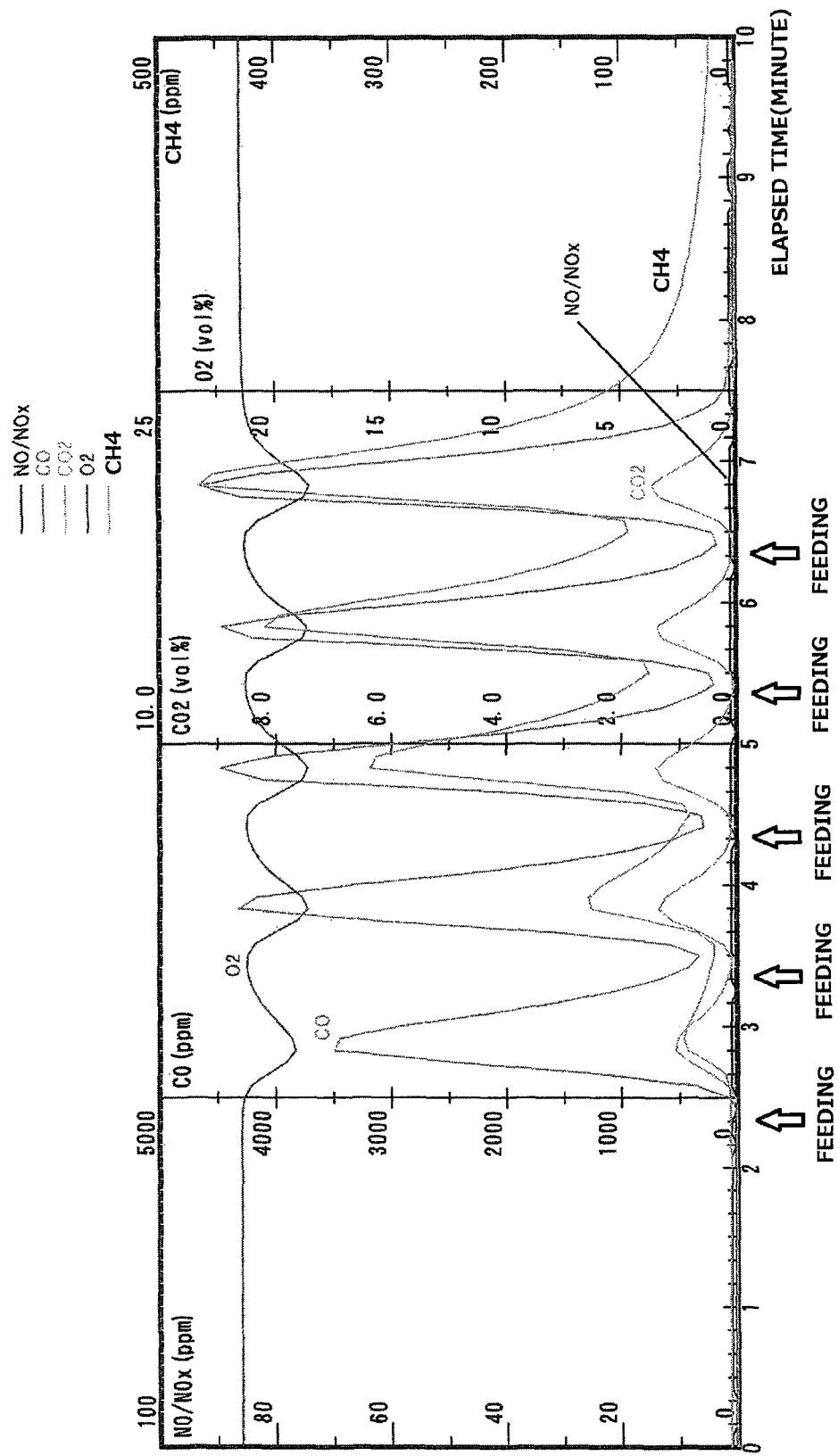
FIG. 5 shows results of decomposition of polyethylene pellets (feeding at 0.2 g/min) by using related-art titanium oxide granules.

FIG. 5 shows the results of the related-art titanium oxide granules.

When polyethylene pellets were fed at 0.2 g/min, the CO concentration rose to from about 3,500 to 4,600 ppm, the $CO_2$ concentration was from about 1.0 to 1.4 vol %, and the $SO_2$ concentration rose to from about 40 to 470 ppm.

(Comparison in Decomposition Efficiency Between Titanium Oxide Granules Having 1 wt % CuO Supported Thereon and Related-Art Titanium Oxide Granules)

In the case of feeding polyethylene pellets at 0.2 g/min, the decomposition efficiency of the titanium oxide granules having 1 wt % CuO supported thereon was compared to that of the related-art titanium oxide granules in terms of the amount of CO generated and the amount of $SO_2$ generated.

The amount of CO generated was from about 50 to 92 ppm in the case of the titanium oxide granules having 1 wt % CuO supported thereon, and on the other hand, was from about 3,500 to 4,600 ppm in the case of the related-art titanium oxide granules. Therefore, the decomposing capability (for comparison in the amount of CO generated) of the titanium oxide granules having 1 wt % CuO supported thereon is from about 38 to 92 times the decomposing capability of the related-art titanium oxide granules.

The amount of $SO_2$ generated was about 6 ppm in the case of the titanium oxide granules having 1 wt % CuO supported thereon and on the other hand, was from about 40 to 470 ppm in the case of the related-art titanium oxide granules. Therefore, the decomposing capability (for comparison in the amount of $SO_2$ generated) of the titanium oxide granules having 1 wt % CuO supported thereon is from about 6 to 78 times the decomposing capability of the related-art titanium oxide granules.

Example 3

Confirmation of Treatment Capability of Titanium Oxide Granules Having Copper Oxide Supported Thereon of the Present Invention for Various Plastics or the Like The treatment capability of the titanium oxide granules having copper oxide supported thereon of the present invention for various plastics or the like was confirmed. In addition, for silicon oil, the treatment capability of the titanium oxide granules of the present invention was compared to that of the related-art titanium oxide granules. Each condition and an apparatus used are as described below.

1. Experimental apparatus (reaction container): 1 kg-volume stirrer-type decomposition experimental apparatus
2. Injected air flow rate: set so that the $O_2$ concentration in final exhaust gas is 12%
3. Temperature in reaction container: 430° C. to 530° C. (set depending on the type of plastic to be treated)
4. Used catalyst: 800 g
Titanium oxide granules having 3 wt % CuO supported thereon obtained in the section (1) of Example 1
Related-art titanium oxide granules (conducted only for silicon oil)
5. Plastics or the like to be treated: polyethylene, PET, polycarbonate, polystyrene, nylon 6, vinyl chloride, ABS, polyurethane, silicon oil, a laminated plate including a glass substrate and an epoxy resin
6. Feed amount of plastics or the like: 1.0 g/min, 1.5 g/min, 2.0 g/min, 0.5 ml, 1.0 ml (see FIG. 6)
7. Rotation number of a stirring blade in a decomposition tank: 60 rpm
8. Exhaust gas flow rate: An exhaust amount is set so that the decomposition tank has a slightly negative pressure considering that the supplied air expands by the temperature of the exhaust gas.
9. Reduction catalyst inlet temperature: 200° C.
10. Oxidation catalyst inlet temperature: 450° C. (Note that the inlet temperature is 500° C. for the silicon oil and 530° C. for the laminated plate including a glass substrate and an epoxy resin)
11. A continuous measurement device for gas concentration PG-250 (manufacturer: HORIBA, Ltd.) was used to measure gas concentrations (NOx, CO, $CO_2$, $O_2$, and $CH_4$).
12. Decomposition treatment method: Each plastic (except for the silicon oil and the laminated plate including a glass substrate and an epoxy resin) was fed five times (n=5) in a row at 1 g/min, 1.5 g/min, or 2 g/min. Note that the silicon oil was fed five times (n=5) in a row at 0.5 ml/min or 1 ml/min, and the laminated plate including a glass substrate and an epoxy resin was fed five times (n=5) at 1 g/min or 2 g/min.

The timing of feeding at which feeding of n=1 started was a time point when the catalyst temperature in the decomposition tank once decreased below the set temperature and then rose and reached near the set temperature. After the start, feeding was conducted in a row every 1 minute (Note that, only in the case of PET at 1 g/min, feeding started when the temperature decreased to reach the set temperature).

(Results of Decomposition Using Titanium Oxide Granules Having 3 Wt % CuO Supported Thereon for Various Plastics or the Like)

FIG. 6 shows the results of decomposition using the titanium oxide granules having 3 wt % CuO supported thereon for various plastics or the like. FIG. 6 revealed that the titanium oxide granules having 3 wt % CuO supported thereon completely decomposed polyethylene, PET, polycarbonate, polystyrene, nylon 6, vinyl chloride, ABS, polyurethane, silicon oil, and the laminated plate including a glass substrate and an epoxy resin.

Further, when the silicon oil was fed at 0.5 ml, the CO concentration rose to 47 ppm in the case of the treatment using the titanium oxide granules having 3 wt % CuO supported thereon, whereas, in the case of the treatment using the related-art titanium oxide granules, the CO concentration rose to 1,200 ppm (not shown in figure). Hence, the decomposing capability (for comparison in the amount of CO generated) of the titanium oxide granules having 3 wt % CuO supported thereon is about 25 times the decomposing capability of the related-art titanium oxide granules.

Example 4

Confirmation of Treatment Capability of Titanium Oxide Granules Having Copper Oxide Supported Thereon of the Present Invention with Varying Temperatures Changes in the treatment capability of the titanium oxide granules having copper oxide supported thereon of the present invention with varying temperatures were confirmed. Each condition and an apparatus used are as described below.

1. Experimental apparatus (reaction container): 1 kg-volume stirrer-type decomposition experimental apparatus
2. Injected air flow rate: 50 L/min at ordinary temperature
3. Set temperature of titanium oxide in reaction container: 300° C. to 420° C. (see FIG. 7A)
4. Used catalyst: 800 g
Titanium oxide granules having 3 wt % CuO supported thereon obtained in the section (1) of Example 1
Related-art titanium oxide granules
5. Plastic to be treated: polyethylene
6. Feed amount of polyethylene: 1.0 g/time
7. Rotation number of a stirring blade in a decomposition tank: 60 rpm
8. Exhaust gas flow rate: 120 L/min
9. Reduction catalyst inlet temperature: 200° C.
10. Oxidation catalyst inlet temperature: 530° C.
11. A continuous measurement device for gas concentration PG-250 (manufacturer: HORIBA, Ltd.) was used to measure gas concentrations {CO, $CO_2$, and $O_2$}.

(Results of Decomposing Capability of Titanium Oxide Granules Having 3 Wt % CuO Supported Thereon with Varying Temperatures)

FIGS. 7A to 7C show the results of the decomposing capability of the titanium oxide granules having 3 wt % CuO supported thereon with varying temperatures. FIG. 7A revealed that the decomposing capability of the titanium oxide granules having 3 wt % CuO supported thereon was significantly higher than that of the related-art titanium oxide granules at each set temperature of 300° C., 320° C.\, 340° C., 360° C., 380° C., 400° C., and 420° C.

Moreover, FIG. 7B revealed that the decomposing capability of the related-art titanium oxide granules rose drastically from around 340° C. On the other hand, FIG. 7C revealed that the decomposing capability of the titanium oxide granules having 3 wt % CuO supported thereon rose drastically from around 300° C. That is, the titanium oxide granules having copper supported thereon have high decomposition efficiency as compared to that of the related-art titanium oxide granules even at low temperature.

Hence, it was confirmed that the optimal range of heating temperature of the titanium oxide granules having copper supported thereon was wide as compared to that of the related-art titanium oxide granules.

Example 5

Confirmation of Optimal Amount of Copper to be Supported in Titanium Oxide Granules Having Copper Oxide Supported Thereon of the Present Invention The optimal amount of copper to be supported in the titanium oxide granules having copper oxide supported thereon of the present invention was confirmed. Each condition and an apparatus used are as described below.

1. Experimental apparatus (reaction container): compact stirrer-type experimental apparatus
2. Injected air flow rate: 50 L/min
3. Temperature in reaction container: 480° C.
4. Used catalyst: 800 g
   Titanium oxide granules having 1 wt %, 2 wt %, or 3 wt % CuO supported thereon obtained in the section (1) of Example 1
   Related-art titanium oxide granules
5. Plastics or the like to be treated: polyethylene
6. Feed amount of plastics or the like: see FIG. 8
7. Rotation number of a stirring blade in a decomposition tank: 60 rpm
8. Exhaust gas flow rate: 340 L/min (exhaust blower: 60 Hz)
9. Amount of gas collected in a decomposition tank: 0.4 L/min
10. Lime pellet: 700 g
11. $MnO_2$ catalyst inlet temperature: 200° C.
12. Pt catalyst inlet temperature: 400° C.
13. A continuous measurement device for gas concentration PG-250 (manufacturer: HORIBA, Ltd.) was used to measure gas concentrations ($CO$, $CO_2$, $O_2$, and $CH_4$).

(Confirmation Results of Optimal Amount of Copper to be Supported for Titanium Oxide Granules Having Copper Oxide Supported Thereon of the Present Invention)

FIG. 8 shows the results of the decomposing capability of the titanium oxide granules having varying weight percentages (1 wt %, 2 wt %, or 3 wt %) of copper oxide supported thereon. FIG. 8 revealed that the decomposing capability of the titanium oxide granules having varying weight percentages of copper oxide supported thereon was significantly higher than that of the related-art titanium oxide granules.

Further, the amount of CO generated was 418 ppm for the titanium oxide granules having 1 wt % CuO supported thereon, 145 ppm for the titanium oxide granules having 3 wt % CuO supported thereon, and 199 ppm for the titanium oxide granules having 5 wt % CuO supported thereon. Hence, it was confirmed that the optimal range of the amount of copper to be supported for the titanium oxide granules having copper oxide supported thereon of the present invention was from 3 wt % to 5 wt %.

Example 6

Confirmation of Wear Resistance of Titanium Oxide Granules Having Copper Oxide Supported Thereon of the Present Invention The wear resistance of the titanium oxide granules having copper oxide supported thereon of the present invention was compared to that of the related-art titanium oxide granules. Each condition and an apparatus used are as described below.

(1) Tester

Abrasive paper #180 was attached to the bottom surface of a stirring blade and a vertical blade of a compact stirrer-type experimental apparatus, and the test was carried out by rotating the blade in the titanium oxide granule catalyst.

(2) Used Titanium Oxide Catalyst

Titanium oxide granules having 3 wt % CuO supported thereon obtained in the section (1) of Example 1
Related-art titanium oxide granules (3) Test Conditions Rotation number of a stirring blade: 60 rpm
Test time: 24 hours
Measurement of wear amount: Titanium oxide, which was removed of fine powders by a 50-mesh sieve (mesh size: 0.3 mm) before the test, was charged into the tester and stirred for 24 hours. After the stirring, the titanium oxide catalyst was separated into granules remaining on the sieve and granules passing through the sieve by the same 50-mesh sieve, and each of the weights of the granules was measured.

(Confirmation Results of Wear Resistance of Titanium Oxide Granules Having Copper Oxide Supported Thereon of the Present Invention)

FIG. 9 shows the confirmation results of the wear resistance of the titanium oxide granules having copper oxide supported thereon of the present invention. FIG. 9 revealed that the wear ratio of the titanium oxide granules having 3 wt % CuO supported thereon was about 1.63 times lower than that of the related-art titanium oxide granules. Therefore, the usable time of the titanium oxide granules having copper oxide supported thereon of the present invention is about 1.63 times longer than that of the related-art titanium oxide granules.

(Overview)

As above, it was confirmed that the treatment capability of the titanium oxide granules having copper oxide supported thereon of the present invention was at least 6 times or more the treatment capability of the related-art titanium oxide granules. In addition, the optimal range of heating temperature of the titanium oxide granules having copper oxide supported thereon of the present invention is wide as compared to that of the related-art titanium oxide granules, and then high treatment capability is achieved even at low temperature. Further, the usable time of the titanium oxide granules having copper oxide supported thereon of the present invention is about 1.63 times longer than that of the related-art titanium oxide granules.

In addition, all the examples of the present invention may be carried out in modes after the application of varieties of improvements, modifications, and changes on the basis of the knowledge of a person skilled in the art within a range not to depart from the scope of the present invention.

Industrial Applicability

The decomposition method of the present invention, the method using titanium oxide granules having a transition metal and/or a transition metal oxide, in particular copper, supported thereon, have, as compared to decomposition methods using the related-art titanium oxide granules, at least about 6 times or more capability of treating plastic and organic waste, has high treatment capability even in a low-temperature region, and further, enables decomposition for a long period of time.

Reference Signs List

201: sample container
202: stirrer
203: shaft
204: stirring blade

The invention claimed is:

1. A catalyst for decomposing plastic and organic waste, comprising titanium oxide granules having a transition metal and/or a transition metal oxide supported thereon and containing titanium oxide as an active component, wherein the catalyst has the following characteristics:
(1) the granules each have a substantially spherical shape;
(2) granules each having a particle diameter of from 0.2 mm to 1.6 mm account for 70% or more of all the granules;
(3) an amount of the transition metal and/or the transition metal oxide to be supported is from 0.1 wt % to 10.0 wt %; and
(4) the transition metal and/or the transition metal oxide is copper and/or copper oxide.

2. A catalyst according to claim 1, wherein an amount of the copper oxide to be supported is from 0.5 wt % to 5.0 wt % in terms of copper oxide.

3. A catalyst according to claim 1, wherein the granules each have a specific surface area in a range of from 30 $m^2/g$ to 50 $m^2/g$.

4. A catalyst according to claim 1, wherein the granules each have a pore volume in a range of from 0.20 cc/g to 0.60 cc/g.

5. A catalyst according to claim 1, wherein the granules each have a wear ratio of 2.0 wt % or less.

6. A catalyst according to claim 1, wherein the granules each have a tap density in a range of from 1.00 g/mL to 1.80 g/mL.

7. A catalyst according to claim 1, wherein the phrase "the granules each have a substantially spherical shape" comprises the following characteristics:
(1) an angle at which a granule first starts sliding is from 0.5° to 15.0°; and
(2) an angle at which all the granules finish sliding is from 2.0° to 30.0°.

8. A method of decomposing plastic and organic waste involving converting plastic and/or organic waste to gas, the method comprising the step of stirring while heating the plastic and/or organic waste in a range of from 300° C. to 560° C. together with a catalyst comprising titanium oxide granules having a transition metal and/or a transition metal oxide supported thereon and containing titanium oxide as an active component, wherein the catalyst has the following characteristics:
(1) the granules each have a substantially spherical shape;
(2) granules each having a particle diameter of from 0.2 mm to 1.6 mm account for 70% or more of all the granules;
(3) an amount of the transition metal to be supported is from 0.1 wt % to 10.0 wt %; and (4) the transition metal and/or the transition metal oxide is copper and/or copper oxide.

9. A decomposition method according to claim 8, wherein an amount of the copper oxide to be supported is from 0.5 wt % to 5.0 wt % in terms of copper oxide.

10. A decomposition method according to claim 8, wherein the granules each have a specific surface area in a range of from 30 $m^2/g$ to 50 $m^2/g$.

11. A decomposition method according to claim 8, wherein the granules each have a pore volume in a range of from 0.20 cc/g to 0.60 cc/g.

12. A decomposition method according claim 8, wherein the granules each have a wear ratio of 2.0 wt % or less.

13. A decomposition method according to claim 8, wherein the granules each have a tap density in a range of from 1.00 g/mL to 1.80 g/mL.

14. A decomposition method according to claim 8, wherein the phrase "the granules each have a substantially spherical shape" comprises the following characteristics:
(1) an angle at which a granule first starts sliding is from 0.5° to 15.0°; and
(2) an angle at which all the granules finish sliding is from 2.0° to 30.0°.

15. A catalyst according to claim 1, wherein the organic waste is decomposing oil.

16. A catalyst according to claim 1, wherein the plastic is thermoplastic or thermosetting plastic.

17. A method according to claim 8, wherein the organic waste is oil.

18. A method according to claim 8, wherein the plastic is thermoplastic or thermosetting plastic.

* * * * *